US007975217B2

(12) United States Patent
Dodin

(10) Patent No.: US 7,975,217 B2
(45) Date of Patent: Jul. 5, 2011

(54) EMBEDDING METADATA WITH DISPLAYABLE CONTENT AND APPLICATIONS THEREOF

(75) Inventor: Ramy Dodin, San Francisco, CA (US)

(73) Assignee: Google Inc., Mountain View, CA (US)

( * ) Notice: Subject to any disclaimer, the term of this patent is extended or adjusted under 35 U.S.C. 154(b) by 857 days.

(21) Appl. No.: 12/004,433

(22) Filed: Dec. 21, 2007

(65) Prior Publication Data

US 2009/0164494 A1    Jun. 25, 2009

(51) Int. Cl.
*G06F 17/22* (2006.01)
(52) U.S. Cl. ...................................... 715/233
(58) Field of Classification Search .................. 715/233
See application file for complete search history.

(56) References Cited

U.S. PATENT DOCUMENTS

| | | | |
|---|---|---|---|
| 6,205,574 B1* | 3/2001 | Dellinger et al. | 716/117 |
| 2003/0023590 A1* | 1/2003 | Atkin | 707/6 |
| 2003/0046257 A1* | 3/2003 | Atkin | 707/1 |
| 2003/0193422 A1* | 10/2003 | Lee et al. | 341/55 |
| 2004/0128614 A1* | 7/2004 | Andrews et al. | 715/501.1 |
| 2004/0225754 A1* | 11/2004 | Lee | 709/247 |
| 2005/0240393 A1* | 10/2005 | Glosson | 704/8 |
| 2005/0275566 A1 | 12/2005 | Lahtiranta et al. | |
| 2006/0174196 A1* | 8/2006 | Zhang et al. | 715/523 |
| 2007/0250509 A1* | 10/2007 | Marti et al. | 707/9 |
| 2007/0250528 A1* | 10/2007 | Ahs et al. | 707/102 |
| 2007/0250811 A1* | 10/2007 | Ahs et al. | 717/114 |
| 2007/0260584 A1* | 11/2007 | Marti et al. | 707/3 |
| 2008/0191909 A1* | 8/2008 | Mak | 341/95 |
| 2008/0313291 A1* | 12/2008 | Kazmi | 709/206 |

OTHER PUBLICATIONS

Chao et al., Information Hiding in Text Using Typesetting Tools With Stego-Encoding, p. 1-4 (Proceedings of the First International Conference on Innovative Computing, Information and Control, ACM, 2006).*
Lassila, O.; "Web Metadata: A Matter of Semantics"; *Internet Computing, IEEE*; Jul./Aug. 1998, pp. 30-37, vol. 2, Issue 4.
"Resources in .Resx File Format"; Microsoft Corporation, 2008. Downloaded from http://msdn2.microsoft.com/en-us/library/ekyft91f(printer).aspx on Mar. 20, 2008; 3 pages.
"Interface Builder"; Wikipedia, Last Edited on Oct. 30, 2007. Downloaded from http://en.wikipedia.org/w/index.php?title=Interface_Builder&oldid=168059829 on Mar. 20, 2008; 2 pages.
"Computer-Assisted Translation"; Wikipedia, Last Edited on Dec. 18, 2007. Downloaded from http://en.wikipedia.org/w/index.php?title=Computer-assisted_translation&oldid=178697137 on Mar. 20, 2008; 7 pages.
PCT Search Report and Written Opinion for PCT Application No. PCT/US2008/013934, mailed Apr. 17, 2009, 13 Pages. Lubin, J., et al., "Robust Content-Dependent, High-Fidelity Watermark for Tracking in Digital Cinema," *Proceedings of the SPIE*, SPIE, Bellingham, WA, United States, Jan. 21, 2003, vol. 5020, pp. 536-545.

* cited by examiner

*Primary Examiner* — Laurie Ries
*Assistant Examiner* — Frank D Mills
(74) *Attorney, Agent, or Firm* — Sterne, Kessler, Goldstein & Fox PLLC

(57) ABSTRACT

The present invention relates to embedding metadata with user interface messages. One method embodiment includes: encoding the metadata into a sequence of non-displayable characters; combining the displayable data and the sequence of non-displayable characters; and sending the combined displayable data and sequence of non-displayable characters to a client for display. In examples, the displayable characters may be displayable Unicode characters, and the non-displayable characters may be non-displayable Unicode characters, such as the left-to-right mark (0x200E) and the right-to-left mark (0x200F).

21 Claims, 9 Drawing Sheets

EMBEDDING METADATA WITH DISPLAYABLE CONTENT AND APPLICATIONS THEREOF

BACKGROUND OF THE INVENTION

1. Field of the Invention

The present invention relates to embedding data.

2. Related Art

Software development is currently being carried out across a number of different platforms and frameworks.

Software localization includes the translation of a software application's user interface (UI) messages. Although software is usually developed in a programming language that is universal, the software generally includes UI messages written in a language not understood by potential international users. For this reason, software localization is necessary for international distribution and marketing.

One way to localize a software application is simply extracting the UI messages from the source code, listing the user interface messages for a translator, and enabling the translator to translate each user interface message individually. For example, the messages may include some fragments of text that populate user interfaces such as "cancel", "ok", and "back". The messages are then presented to a translator to be translated into a different language. A problem with this approach is that the translator may not know the context of when and where the UI messages appear. Because these messages are out of context, it is very difficult to translate them correctly. This is especially true for messages that include so-called "placeholders" that require input, e.g. addresses, dates, credit card numbers, etc.

Software is often developed using application frameworks. Some application frameworks use rich resource formats, such as Microsoft's .RESX and Apple's .NIB, to enrich the messages with some layout information. These rich resource formats may provide the translator with some context information helpful for translating the user interface messages. However such formats are not available for other frameworks, especially cross-platform frameworks, web applications, and mobile applications.

Other applications aside from software localization also have solutions that do not work across frameworks or platforms. In particular, applications that enable a user to report a bug, to request a feature, and to track usage tend to be tied to a particular platform or framework.

BRIEF SUMMARY

The present invention relates to embedding metadata with user interface messages. One method embodiment retrieves a translation of a user interface (UI) message encoded as displayable data. The method embodiment includes: converting an index identifying a first translation of the UI message into a binary number; mapping each digit of the binary number to either a Unicode left-to-right mark (0x200E) or a Unicode right-to-left mark (0x200F) to form a sequence of non-displayable characters; combining the sequence of non-displayable characters and the displayable data; and sending the displayable data with embedded metadata to a client for display. The displayable data represents the user interface message. The method further includes: receiving a request including the index; and retrieving the first translation of the user interface message identified by the index.

Another method embodiment embeds metadata with displayable data representing a UI message. The method includes: encoding the metadata into a sequence of non-displayable characters; combining the displayable data and the sequence of non-displayable characters; and sending the combined displayable data and sequence of non-displayable characters to a client.

In another embodiment, a system embeds metadata in displayable data. The system embodiment includes a message ID encoder. The message ID encoder encodes the metadata into a sequence of non-displayable characters. A message combiner combines the sequence of non-displayable characters and the displayable data. Finally, a server sends the combined displayable data and the sequence of non-displayable characters to a client.

In examples, embodiments of this invention also enable users to suggest translations to a UI message. In those embodiments, the UI message's identifier is sent with a request for a translation of the UI message. A translation server retrieves the translation of the UI message based on the identifier and sends it to the local user. After the local user receives the translation of the UI message, the user may suggest a new, improved translation. The suggested translation is sent to the translation server with the message ID. Finally, the translation server updates the translation of the source data according to the suggested translation.

As discussed, embodiments of the present invention embed metadata into displayable data representing UI messages. In embodiments, the metadata may be an index identifying the displayable data. In example embodiments, the index may be used to translate UI messages, to accept bug reports and feature requests, or to analyze usage. The index may be encoded into non-displayable Unicode characters. Unicode characters are widely used in many frameworks and platforms. For this reason, embodiments of this invention may enable translators to localize software operating in many different application frameworks, platforms, and browser systems that is transparent to users.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings.

In the drawings, like reference numbers may indicate identical or functionally similar elements. The drawings in which an element first appears is generally indicated by the left-most digit in the corresponding reference number.

DETAILED DESCRIPTION OF EMBODIMENTS

The present invention relates to embedding metadata with user interface messages. In example embodiments, the metadata may be used to translate UI messages, to accept bug reports and suggested features and to track usage. These examples are illustrative and are not intended to limit the present invention.

In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment of the present invention, each user interface (UI) message in a software application has associated metadata, such as a message identifier (ID). Each UI message is encoded as displayable data, such as displayable Unicode characters. The message ID is converted to binary. Each binary digit of the converted message ID maps to a non-displayable character. In an example, the non-displayable characters may include the Unicode left-to-right mark (0x200E) and the Unicode right-to-left mark (0x200F). This results in a sequence of non-displayable characters representing the message ID. The sequence of non-displayable characters may be appended to the displayable data representing the UI message. When the appended sequence of characters is displayed, for example, by a browser, the displayable data is shown, but the non-displayable data is not. Still, the non-displayable data representing the message ID may be used, for example, to request a translation of the UI message and to suggest a new translation of the UI message. In other examples, the non-displayable data may be used by other applications, such as reporting bugs, suggesting new features, and analyzing usage. Unicode characters are used across many platforms and frameworks. For this reason, embodiments of this invention embed metadata with UI messages in software applications developed for many different platforms and frameworks.

Figure 1A:
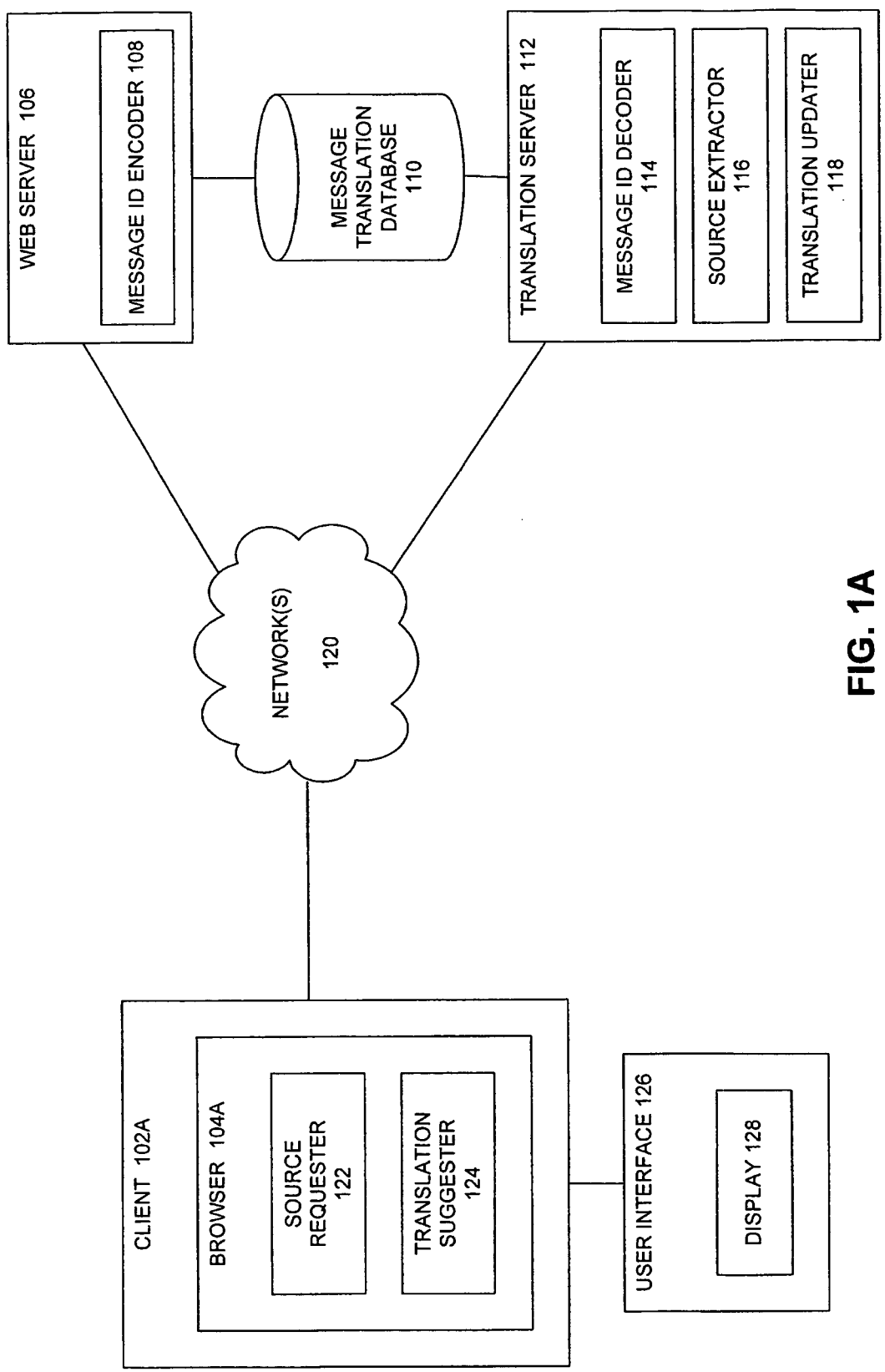
FIG. 1A is an architecture diagram of a system enabling software localization in a web platform, according to an embodiment of the present invention.

FIG. 1A is an architecture diagram of a system 100 for enabling software localization on a web platform, according to an embodiment of the present invention.

System 100 enables the localization of a software application operating on a web platform with user-supplied translations. System 100 includes a web server 106, a message translation database 110, a translation server 112, and a client 102A. Web server 106, translation server 112 and client 102A are connected through network(s) 120. Web server 106 is a software component that responds to a hypertext transfer protocol (HTTP) request with an HTTP reply. As illustrative examples, web server 106 may be, without limitation, an Apache HTTP Server, Apache Tomcat, Microsoft Internet Information Server, JBoss Application Server, WebLogic Application Server, or Sun Java System Web Server. Web server 106 may serve content such as hypertext markup language (HTML), extendable markup language (XML), documents, videos, images, multimedia features, or any combination thereof. These examples are strictly illustrative and do not limit the present invention.

Message translation database 110 stores source UI messages associated with the software and corresponding translated messages. The source UI messages may be in the language of an original developer of the software. Each source UI message has corresponding metadata, such as a numerical message ID.

Web server 106 may contain a message ID encoder 108, which encodes the numerical message IDs, and perhaps other metadata, into non-displayable data. In embodiments, message ID converts the message ID into binary and maps each binary digit to a non-displayable Unicode character. When web server 106 sends the localized software to client 102A upon request, the Unicode characters corresponding to the message IDs are appended to the translated UI messages and sent to client 102A. This will be described in more detail below.

Network(s) 120 can be any network or combination of networks that can carry data communication, and may be referred to herein as a computer network. Network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Client 102A includes a browser 104A, which includes a source requester 122 and a translation suggester 124. In an example, browser 104A may display a page to a user using user interface 126. The page may include UI messages translated in the user's local language. Source requester 122 enables the user to request a translation of the UI message in the source language. This may be helpful for a user when the meaning of a UI message is unclear. Source requester 122 then sends a request to translation server 112, as will be described in more detail below.

Translation suggester 124 enables a user to suggest a new translation of the UI messages displayed by browser 124. Translation suggester 124 sends the suggested translation to translation server 112. A translation updater 118 may then update message translation database 110 according to the suggested translation. The operation of translation suggester 124, translation updater 118, and source requester 122 is described in more detail below.

In examples, browser 104A may be a Mozilla Firefox, Apple Safari, Microsoft Internet Explorer, or other suitable browser. Source requester 122 and translation suggester 124, for example, can be executed as a script within browser 104A, as a plug-in within browser 104A, or as a program which executes within a browser plug-in, such as the Adobe (Macromedia) Flash plug-in. These examples are illustrative and not intended to limit the present invention.

Client 102A also connects to a user interface 126 that contains a display 128. Display 128 displays the translated software and associated translated UI messages to a local user. As an illustrative example, display 128 may be a computer screen. User interface 126 also has a mechanism for the user to interact with components of client 102A. For example, user interface 126 may have a mouse that allows the user to make a selection on display 128. In another example, user interface 126 may allow the user to make a selection using a keyboard or touch screen. These examples are merely illustrative and are not intended to limit the invention.

Translation server 112 includes a message ID decoder 114, a source extractor 116, and a translation updater 118. Message ID decoder 114 decodes the message ID encoded in non-displayable Unicode characters into the original numerical message ID. In other examples, message ID decoder 114 may also decode other types of metadata relating to a UI message. In the system 100, the message ID decoder 114 is included in the translation server 112. However, in alternative embodiments the message ID decoder 114 may be a included on client 102A and may be implemented, for example, in a scripting language, such as JavaScript.

Once the message ID is decoded by message ID decoder 114, source extractor 116 uses the message ID to select the source UI message from message translation database 110. The source UI message is then returned to browser 104A for display, as will be described below.

Note that FIG. 1A only shows one exemplary system for software localization in a web platform according to one embodiment of the invention. Localization and translation of other types of software are also supported by embodiments of the current invention. In this way, local users of system 100 can supply translations for any displayable data of any type of software.

Figure 1B:
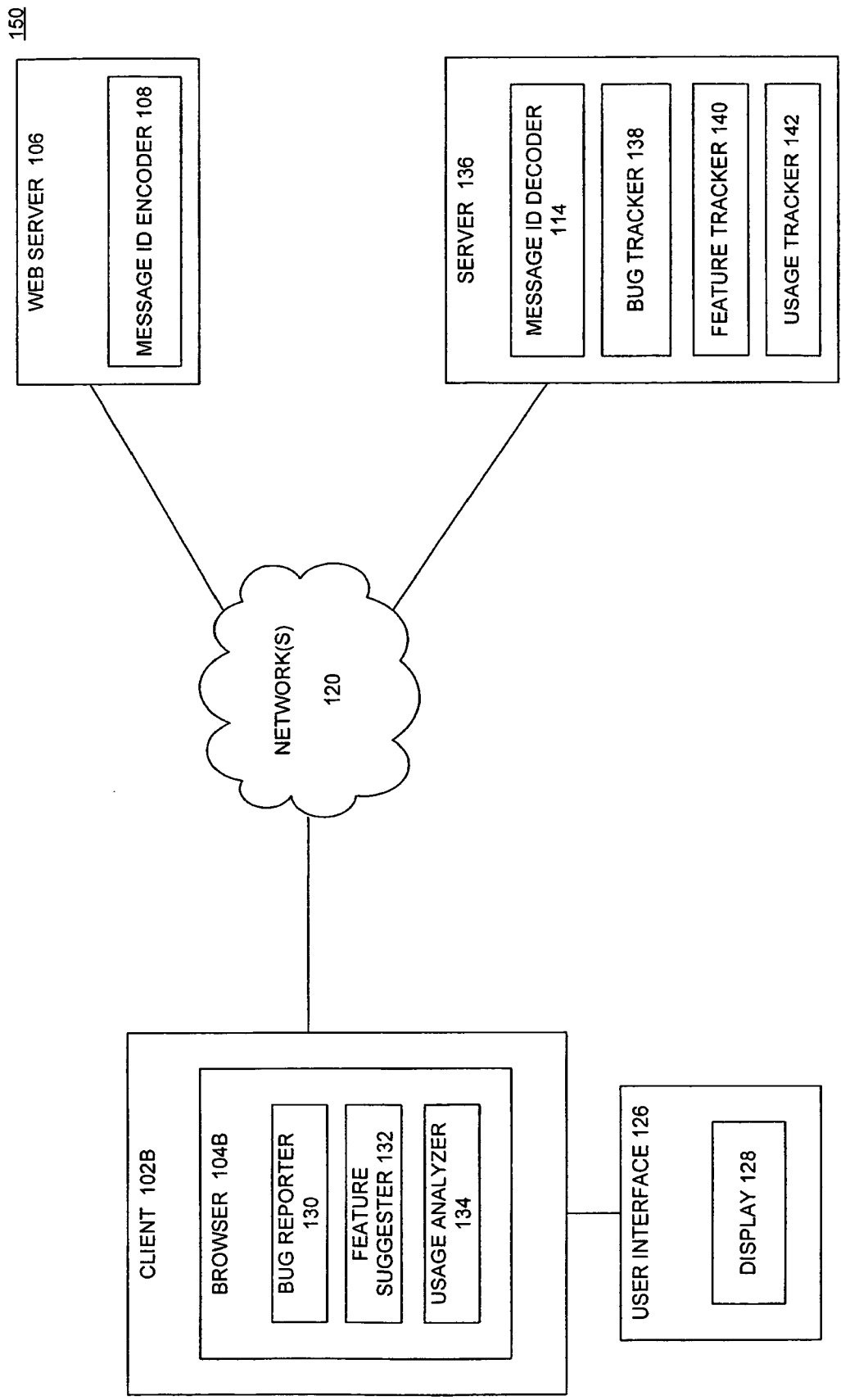
FIG. 1B is an architecture diagram of a system for reporting bugs, suggesting features, and tracking usage in a web platform, according to an embodiment of the present invention.

FIG. 1B is an architecture diagram of a system 150 for reporting bugs, suggesting features, and tracking usage in a web platform, according to an embodiment of the present invention.

System 150 includes web server 106 and network 120, as in FIG. 1A. System 150 also includes a client 102B and a browser 104B, which are similar to client 102A and a browser 104A in FIG. 1A. As in FIG. 1A, client 102B is coupled to user interface 126 and display 128.

As in FIG. 1A, web server 106 includes a message ID encoder 108 that encodes the numerical message IDs, and perhaps other metadata, into non-displayable data. That non-displayable data is embedded with displayable data representing UI messages. The displayable data may be displayable Unicode characters, whereas the non-displayable data may be non-displayable Unicode characters. The non-displayable data is embedded with displayable data, and both are sent to browser 104, perhaps as an HTML page. While browser 104 sends the displayable data to user interface 126 for display to a user on display 128, the embedded non-displayable data is not displayed to a user. However, the non-displayable data is there for use by components of browser 104B.

Browser 104B includes a bug reporter 130, a feature suggester 132 and a usage analyzer 134. Each of bug reporter 130, feature suggester 132 and usage analyzer 134 performs a function using the non-displayable data embedded with the displayable data representing UI messages received from web server 106. Each of bug reporter 130, feature suggester 132 and usage analyzer 134 may be implemented as a module of browser 104B, as a browser extension, or in a client side script, such as JavaScript.

Bug reporter 130 enables a user to report a bug. The bug may be related to the UI message. For example, bug reporter 130 may enter a reporting mode. Bug reporter 130 may solicit information about the bug from a user. After the user enters information about the bug, bug reporter 130 sends the information along with non-displayable data associated with the bug to a server 136. The non-displayable data associated with the bug may be all the non-displayable data on a page or may be non-displayable data associated with a particular UI message.

Server 136 includes a message ID decoder 114, as in FIG. 1. The message ID decoder 114 decodes the non-displayable data received in a bug report from bug reporter 130 to determine metadata about one or more UI messages. The metadata is then sent to a bug tracker 138. Bug tracker 138 uses the metadata to identify a piece of source code associated with the bug and a developer of the piece of source code. The developer may be notified that a bug has been reported. As result of this automation, bug reporter 130 and bug tracker 138 may reduce the time needed to fix bugs.

Feature suggester 132 enables a user to suggest new features or enhancements to the software application. The new feature may be related to a UI message displayed to the user. In an example, feature suggester 132 may solicit feedback and suggested new features from a user. After the user enters the suggestion, feature suggester 132 may send the suggestion along with related non-displayable data to server 136. Message ID decoder 114 decodes the non-displayable data to determine associated metadata. A feature tracker 140 uses the metadata to identify particular UI messages, UI screens or a portion of source code associated with the suggestion. Feature tracker 140 may present this information to a product manager or a developer associated with the source code. In this way, feature suggester 132 and feature tracker 140 may efficiently manage user feedback to improve software applications.

Usage analyzer 134 collects statistics related to how a user interacts with a software application. In an example, usage analyzer 134 may collect information as to whether a user mouses over or views a particular UI message. Usage analyzer 134 sends that information along with non-displayable data embedded with the UI messages to server 136. Message ID decoder 114 decodes the non-displayable data to determine metadata associated with the UI messages. A usage tracker 142 may record that information. Usage tracker 142 may use that information to determine, for example, how effective an advertisement is.

As discussed, system 150 reports bugs, suggests features, and tracks usage. In practice any combination of those features may be included.

Bug tracker 138, feature tracker 140, and usage tracker 142 may be implemented in hardware, software, firmware, or any combination thereof.

Figure 2:
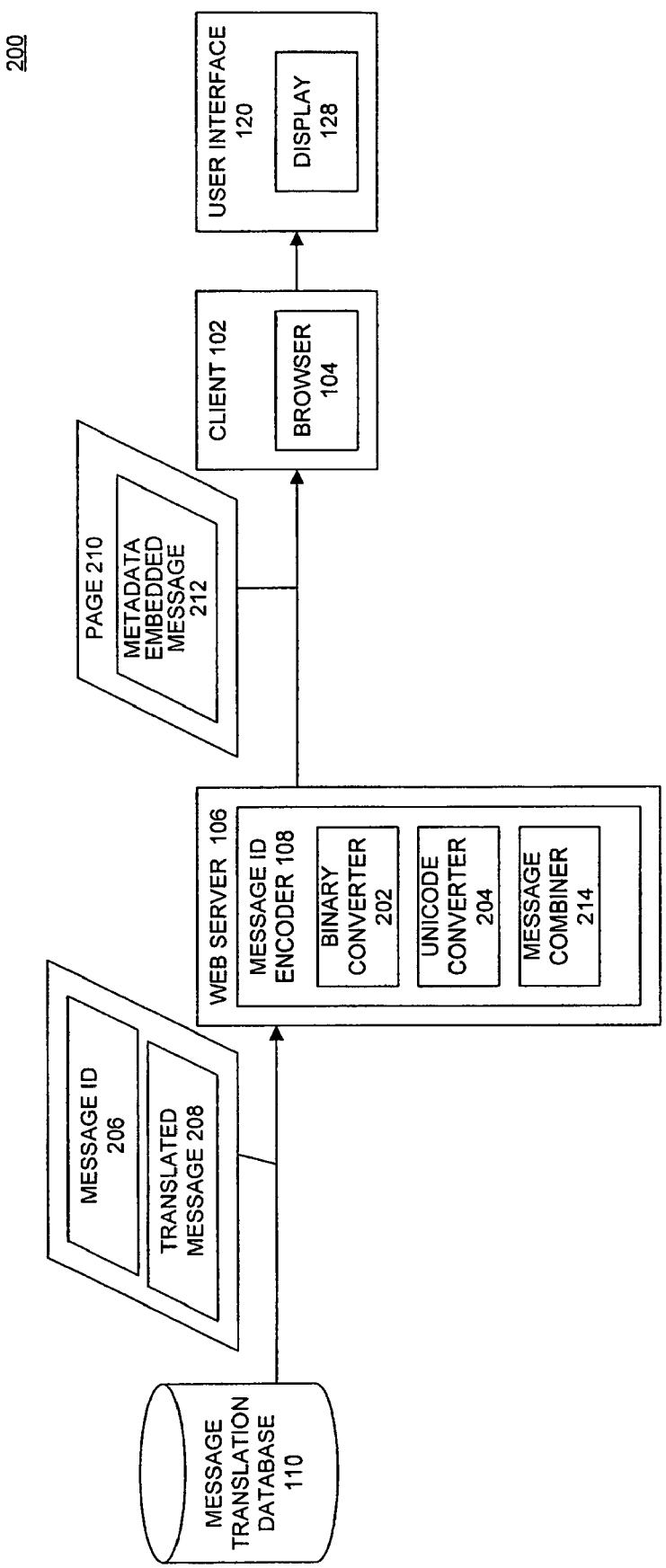
FIG. 2 is an architecture diagram showing how components of the system of FIG. 1A and the system of FIG. 1B may interoperate to embed metadata in displayable data.
Figure 4:
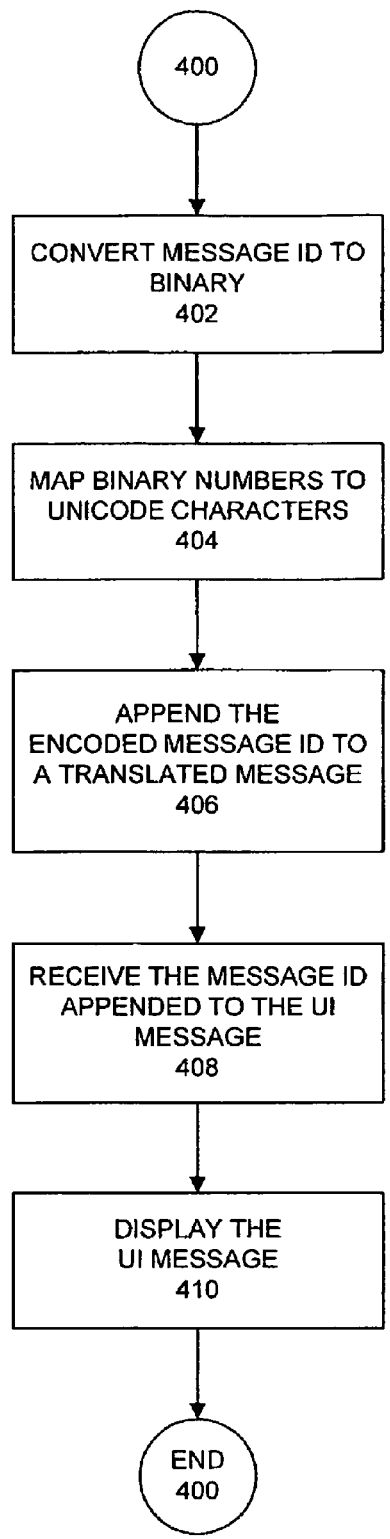
FIG. 4 is a flowchart showing a process for embedding metadata, according to an embodiment of the present invention.

FIG. 2 shows an architecture diagram 200 showing how components of system 100 and system 150 may interoperate to embed metadata in displayable data. In an example, the components shown in FIG. 2 may operate according to procedure 400 in FIG. 4. Although procedure 400 will be described with reference to diagram 200, one of skill in the art will recognize that procedure 400 may be used with other types of systems without departing from the spirit and scope of the present invention.

In an example, procedure 400 may be initiated by an HTTP request for a page, such as an HTML page, from client 102. Client 102 refers to both client 102A in FIG. 1A and client 102B in FIG. 1B. To generate the HTML page, in step 401, web server 106 retrieves a UI message 208 translated into the user's local language from message translation database 110. The message is included in the HTML page. Web server 106 also retrieves a message ID 206 that identifies the message.

In one embodiment, message ID 206 is a 64 bit content hash of the UI message. In alternative embodiments, message ID 206 may also be a sequential ID issued within the scope of the software.

Because the message ID is not part of the data to be displayed to the local users, it needs to be encoded as non-displayable characters, such as some Unicode characters, before being sent out to a client. In step 402, message ID encoder 108 first uses binary converter 202 to convert the metadata, numerical message ID 206, into a binary number. Message ID encoder 108 may be implemented using, for example, JAVA, Python, or JavaScript, etc.

In step 404, Unicode converter 204 maps each digit in the converted binary number to a non-displayable character. In an example, the non-displayable characters may be special Unicode characters that are not displayable by browser 104. Browser 104 refers to both browser 104A in FIG. 1A and browser 104B in FIG. 1B. In one embodiment, the special Unicode characters are the left-to-right mark (0x200E) and the right-to-left mark (0x200F). In another embodiment, Unicode converter 204 may map each binary digit to a sequence of the left-to-right marks (0x200E) and the right-to-left marks (0x200F).

In step 406, message combiner 214 combines the Unicode message ID with the corresponding UI message 208 and generates metadata embedded message 212. In an example, UI message 208 may be a message from message translation database 110 in the user's local language. In one example, message combiner 214 appends the Unicode message ID to translated message 208. In alternative embodiments, the encoded metadata (e.g. non-displayable Unicode message ID) may be embedded into the generated data using other data embedding techniques.

Web server 106 then sends page 210 that contains metadata embedded message 212 to client 102. In step 408, client 102 receives page 210. In page 210, the non-displayable Unicode message ID is appended to translated message 212. In step 410, browser 104 displays translated message 208 on display 128.

When a local user reads a translated UI message and wants to make suggestions for the translation, he/she may need to first review the corresponding source UI message. Because a translational relationship is bi-directional, the source UI message can be viewed as a translation of the translated UI message in general.

Figure 3A:
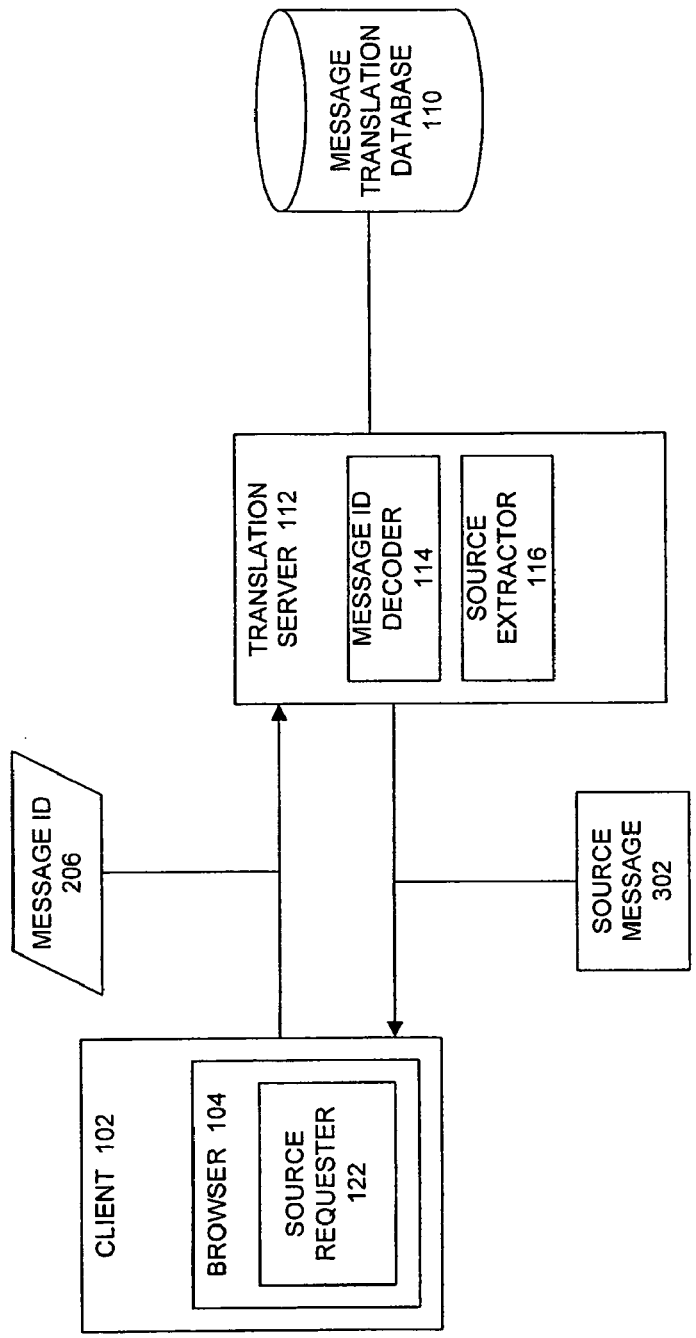
FIG. 3A is an architecture diagram showing how components of the system of FIG. 1A may interoperate to retrieve a translation of the displayable data.
Figure 5A:
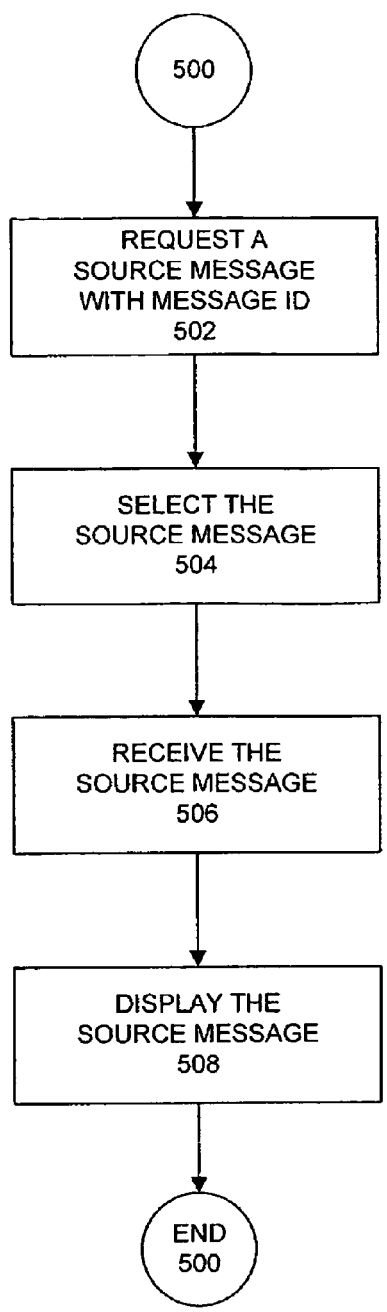
FIG. 5A is a flowchart showing a process for retrieving a translation, according to an embodiment of the present invention.

FIG. 3A shows an architecture diagram 300 showing how components of the system 100 may interoperate to retrieve a translation of the displayable data. In an example, the components of system 100 shown in FIG. 3A may operate according to procedure 500 of FIG. 5A. Although procedure 500 will be described with reference to diagram 300, one of skill in the art will recognize that procedure 500 may be used for localization and translation for other types of software without departing from the spirit and scope of the present invention.

Source requester 122 enables a user to send a request for a translation of a UI message displayed on a page. In example, the translation of the UI message requested by source requester 122 may be the source message in the language originally used by the developer.

A message ID is embedded in the UI message displayed on the page. In an example embodiment, the user may enter a translation mode on browser 104A. In entering the translation mode, JavaScript (or other client-side script) may be executed that enables a user to select a particular UI message displayed on a page and request a translation of that message. Then, source requester 122 retrieves the corresponding message ID embedded in that UI message. The message ID is encoded as non-displayable data. In particular, the message ID may be encoded as a sequence of non-displayable Unicode characters.

In step 502, source requester 122 retrieves the corresponding message ID 206 and sends a request for source message with message ID 206 to translation server 112. Message ID 206, for example, may be an HTTP parameter in an HTTP request. In alternative embodiments, source requester 122 may also supply a screenshot related to the requested translation. In one embodiment, source requester 122 may be implemented using scripting elements, for example, using JavaScript. Translation server 112 and its components may be implemented using any suitable programming languages, including, but not limited to, C++, JAVA, C#, etc. These examples are merely illustrative and not intended to limit the invention.

In step 504, message ID decoder 114 decodes message ID 206 into the corresponding numerical message ID. In an alternative embodiment, message ID may be decoded on at client 102. Source extractor 116 retrieves the source message 302 corresponding to the decoded message ID from message translation database 110. Source message 302 is a translation of the UI message displayed to the user. In an example, source message 302 may the UI message in the language used by the original developer. Translation server 112 then sends source message 302 to client 102A. In an example, source message 302 may be contained as an HTTP response. In another example, the source message may be contained in an XML web service.

In step 506, client 102A receives source message 302. In step 508, browser 104A displays source message 302 to the local user.

Figure 3B:
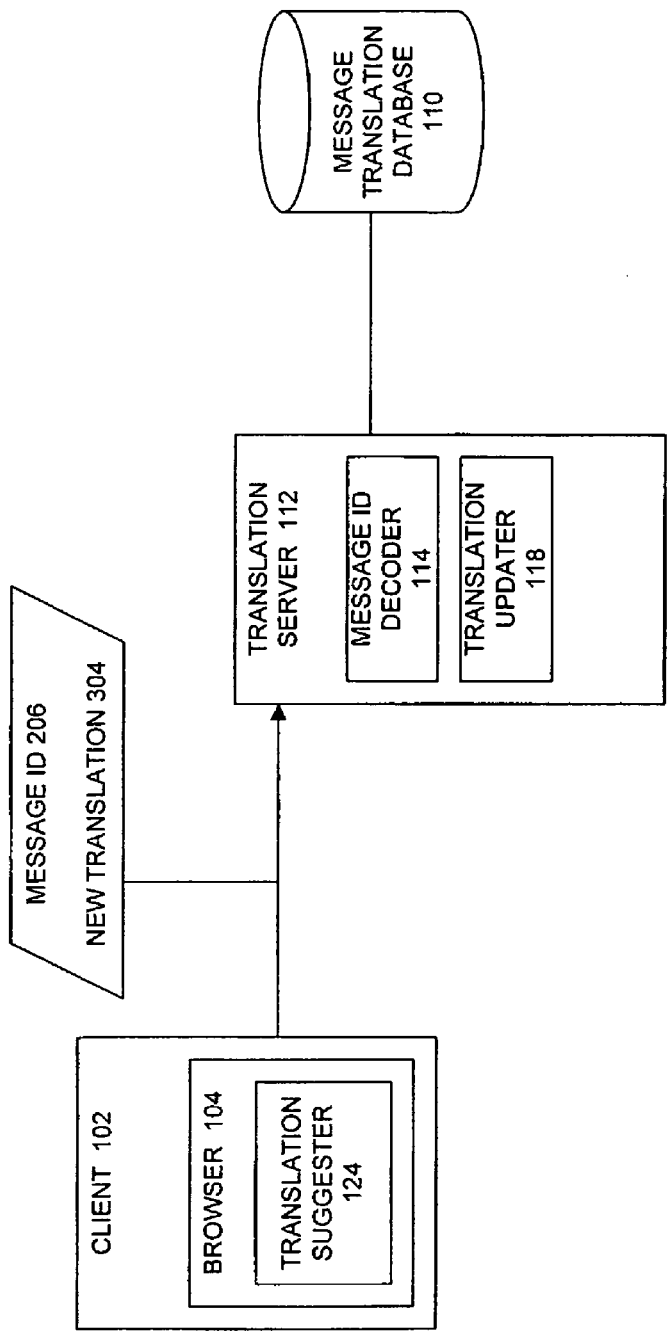
FIG. 3B is an architecture diagram showing how components of the system of FIG. 1A may interoperate to enable a translator to suggest a new translation.
Figure 5B:
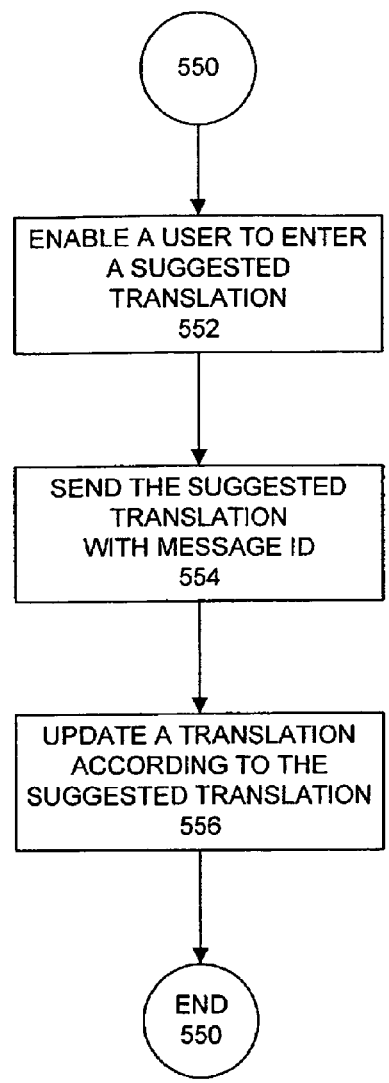
FIG. 5B is a flowchart showing a process for suggesting a translation, according to an embodiment of the present invention.

After reviewing the source UI message, the local user can suggest a translation for the source UI message accordingly. FIG. 3B shows an architecture diagram 350 illustrating how components of the system 100 may interoperate enable a user to suggest a new translation. In an example, the components shown in FIG. 3B may operate according to procedure 550 in FIG. 5B. Although procedure 550 will be described with reference to diagram 350, one of skill in the art will recognize that procedure 550 may be used for localization and translation for other types of software without departing from the spirit and scope of the present invention.

The local user suggests a new translation of a UI message through translation suggester 124 on browser 104A. In one embodiment, translation suggester 124 may be implemented using a client scripting language, such as JavaScript. Translation suggester 124 may be activated by entering into a translation mode. When activated, the user may enter a suggested translation using a user interface device at step 552. Then, in step 554, client 102A sends a suggested new translation 304, together with message ID 206, to translation server 112. Message ID 206 is the message ID embedded in the UI message. In alternative embodiments, client 102A may also supply a screenshot related to the suggested translation.

In step 556, message ID decoder 114 decodes message ID 206 into the corresponding numerical message ID. Translation server 112 may retrieve the corresponding translated message from message translation database 110 and compare with new translation 304. In alternative embodiments with supplied screenshots, translation server 112 may also store the screenshots for administrator or translator review. If new translation 304 is determined to be a better translation than the previous version, translation updater 118 updates message translation 110 using new translation 304.

Figure 6:
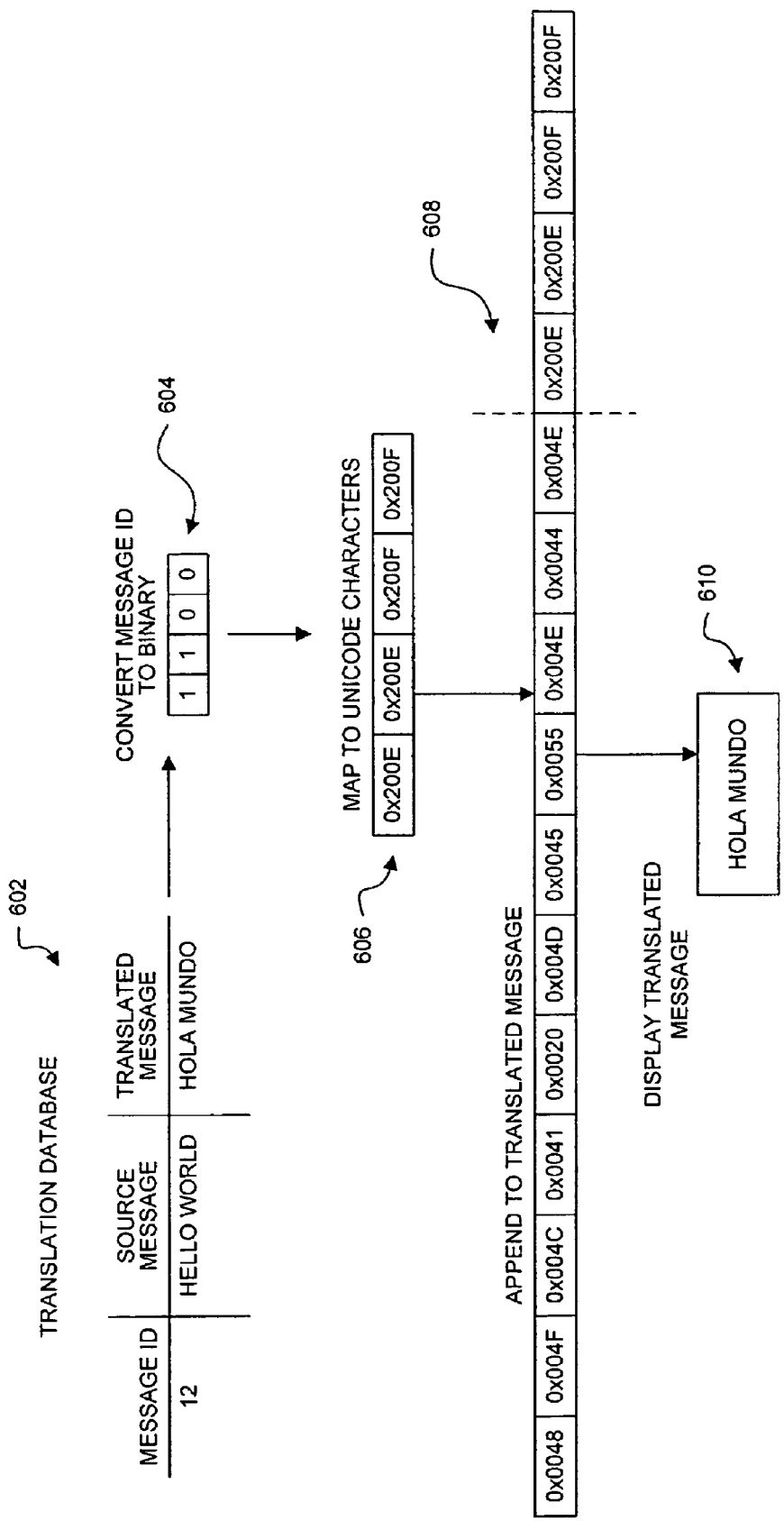
FIG. 6 is an example showing how metadata may be embedded in a message, according to an embodiment of this invention.

FIG. 6 is an example 600 of encoding a message ID and embedding with a UI message according to one embodiment of the invention. Example 600 is an example of the operation of both system 100 in FIG. 1A and system 150 in FIG. 1B. A data entry 602 maps a numerical message ID "12", a source message "HELLO WORLD", and a translated message "HOLA MUNDO". In one embodiment, data entry 602 may be an entry in message translation database 110, shown in FIG. 1A. The message ID "12" is converted to a binary number "1100" as shown at 604. The binary number "1100" is then mapped to a sequence of nondisplayable data, such as special Unicode characters, as shown at 606. In one embodiment, the special Unicode characters are the left-to-right mark (0x200E) and the right-to-left mark (0x200F).

The Unicode message ID corresponding to binary ID "1100" is "0x200E 0x200E 0x200F 0x200F". The translated message in data entry 602 is also converted to a sequence of Unicode characters "0x0048 0x004F 0x004C 0x0041 0x0020 0x004D 0x0045 0x0055 0x004E 0x0044 0x004F".

The Unicode sequence for the message ID is combined with the UI message. In an embodiment, the non-displayable Unicode sequence for the message ID is appended to the displayable Unicode sequence representing the UI message, as shown at 608. The encoded UI message with embedded metadata is shown at 608 as "0x0048 0x004F 0x004C 0x0041 0x0020 0x004D 0x0045 0x0055 0x004E 0x0044 0x004E 0x200E 0x200E 0x200F 0x200F". Because "0x200E" and "0x200F" are non-displayable characters, the embedded message ID will not be displayed. Only the translated message "HOLA MUNDO" will be displayed to a user as shown at 610. When the user wants to suggest an alternative translation or retrieve the source "HELLO WORLD" the appended Unicode message ID can be retrieved from the string at 608, as described earlier.

As described earlier, Unicode characters are used across many platforms and frameworks. For, this reason, embodiments of this invention facilitate localization of software developed for many different platforms and frameworks.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for embedding metadata with displayable data, comprising:
   (a) encoding the metadata into a sequence of non-displayable characters;
   (b) combining displayable data and the sequence of non-displayable characters; and
   (c) sending the combined displayable data and sequence of non-displayable characters to a client;
   wherein the encoding step (a) comprises:
   converting the metadata into a binary number; and
   mapping each digit of the binary number to a non-displayable Unicode character, and
   wherein the displayable data includes a sequence of displayable Unicode characters.

2. The method of claim 1, wherein the mapping comprises mapping each digit of the binary number to either a left-to-right mark (0x200E) or a right-to-left mark (0x200F).

3. The method of claim 1, wherein the combining step (b) comprises appending the sequence of non-displayable characters to the displayable data.

4. The method of claim 1, wherein the metadata is an index identifying the displayable data.

5. The method of claim 4, wherein the displayable data represents a translation of a source message, and further comprising:
   (d) receiving a request including the index; and
   (e) retrieving the translation identified by the index.

6. The method of claim 4, wherein the displayable data represents a translation of a source message suggested by a user, and further comprising:
   (d) receiving a request including the index; and
   (e) storing the translation according to the index.

7. The method of claim 4, further comprising:
   (d) receiving a request including a bug report and the index identifying the displayable data; and
   (e) storing the bug report according to the index.

8. The method of claim 4, further comprising:
   (d) receiving a request including a feature suggestion and the index identifying the displayable data; and
   (e) storing the feature suggestion according to the index.

9. The method of claim 4, further comprising:
   (d) receiving a request including usage data and the index identifying the displayable data; and
   (e) storing the usage data according to the index.

10. A system for embedding metadata with displayable data, comprising:
    a message ID encoder that encodes the metadata into a sequence of non-displayable characters;
    a message combiner that combines displayable data and the sequence of non-displayable characters; and
    a server, implemented on at least one computer, that sends the combined displayable data and sequence of non-displayable characters to a client;
    wherein the message ID encoder comprises:
    a binary converter that converts the metadata into a binary number; and
    a Unicode converter that maps each digit of the binary number to a non-displayable Unicode character, and
    wherein the displayable data includes a sequence of displayable Unicode characters.

11. The system of claim 10, wherein the Unicode converter maps each digit of the binary number to either a left-to-right mark (0x200E) or a right-to-left mark (0x200F).

12. The system of claim 10, wherein the message combiner appends the sequence of non-displayable characters to the displayable data.

13. The system of claim 10, wherein the metadata is an index identifying the displayable data.

14. The system of claim 13, wherein the displayable data represents a translation of a source message, and further comprising a translation server that receives a request including the index and retrieves the translation of the displayable data identified by the index.

15. The system of claim 13, wherein the displayable data represents a translation of a source message suggested by a user, and further comprising a translation server that receives a request including the index and stores the translation according to the index.

16. The system of claim 13, further comprising a module that receives a request including a bug report and the index identifying the displayable data and stores the bug report according to the index.

17. The system of claim 13, further comprising a module that receives a request including a feature suggestion and the index identifying the displayable data and stores the feature suggestion according to the index.

18. The system of claim 13, further comprising a module that receives a request including usage information and the index identifying the displayable data and stores the usage information according to the index.

19. A computer-implemented method for retrieving a translation of a user interface message encoded as displayable data comprising:

(a) converting an index identifying a first translation of the user interface message into a binary number;

(b) mapping each digit of the binary number to either a left-to-right mark (0x200E) or a right-to-left mark (0x200F) to form a sequence of non-displayable characters;

(c) combining the sequence of non-displayable characters and the displayable data representing the user interface message;

(d) sending the combined displayable data and the sequence of non-displayable characters to a client;

(e) receiving a request including the index; and (f) retrieving the first translation of the user interface message identified by the index.

20. The method of claim 19, wherein the combining in step (c) comprises appending the sequence of non-displayable characters to the displayable data.

21. The method of claim 19, further comprising:

(g) receiving a second request including the index and a second translation, wherein the second translation is suggested by a user; and (h) storing the second translation according to the index in the second request.

\* \* \* \* \*